(12) United States Patent
Inagaki et al.

(10) Patent No.: US 11,186,777 B2
(45) Date of Patent: Nov. 30, 2021

(54) FLAME RETARDANT COMPOSITION AND FLAME-RETARDANT RESIN COMPOSITION CONTAINING SAME

(71) Applicant: ADEKA CORPORATION, Tokyo (JP)

(72) Inventors: Yohei Inagaki, Saitama (JP); Kei Asai, Saitama (JP); Genta Kokura, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 0 days.

(21) Appl. No.: 16/624,711

(22) PCT Filed: Jul. 4, 2018

(86) PCT No.: PCT/JP2018/025407
§ 371 (c)(1),
(2) Date: Dec. 19, 2019

(87) PCT Pub. No.: WO2019/009340
PCT Pub. Date: Jan. 10, 2019

(65) Prior Publication Data
US 2020/0115634 A1    Apr. 16, 2020

(30) Foreign Application Priority Data

Jul. 7, 2017 (JP) .............................. JP2017-134172

(51) Int. Cl.
*C09K 21/12* (2006.01)
*C08K 3/26* (2006.01)
(Continued)

(52) U.S. Cl.
CPC .............. *C09K 21/12* (2013.01); *C08J 3/226* (2013.01); *C08K 3/26* (2013.01); *C08K 5/529* (2013.01);
(Continued)

(58) Field of Classification Search
None
See application file for complete search history.

(56) References Cited

U.S. PATENT DOCUMENTS 7,465,761 B2 * 12/2008 Murase .............. C08K 5/34928
524/100
2007/0176154 A1    8/2007 Murase et al.
(Continued)

FOREIGN PATENT DOCUMENTS

JP    2008-208269 A    9/2008
JP    2010209239 A    9/2010
(Continued)

OTHER PUBLICATIONS

Shin-Etsu's Silicone Fluid Brochure at https://www.shinetsusilicone-global.com/catalog/pdf/fluid_e.pdf (2019).*

(Continued)

*Primary Examiner* — Vu A Nguyen
(74) *Attorney, Agent, or Firm* — Nixon & Vanderhye

(57) ABSTRACT

A flame retardant composition containing a piperazine phosphate, a melamine phosphate, and an oil having a siloxane bond and a specific gravity of 0.930 to less than 0.970 at 25° C. The oil is present in an amount of 0.01 to 5 parts by mass per 100 parts by mass of the sum of the piperazine phosphate and the melamine phosphate. The flame retardant composition preferably further contains 0.01 to 5 parts by mass, per 100 parts by mass of the sum of the piperazine phosphate and the melamine phosphate, of a methylhydrogen silicone oil having hydrogen as part of the side chains of polysiloxane and a specific gravity of 0.970 to less than 1.01 at 25° C.

11 Claims, 1 Drawing Sheet

(51) Int. Cl.
  *C08K 5/529* (2006.01)
  *C08K 13/02* (2006.01)
  *C08J 3/22* (2006.01)
  *C08L 23/12* (2006.01)
(52) U.S. Cl.
  CPC .............. *C08K 13/02* (2013.01); *C08L 23/12* (2013.01); *C08K 2003/267* (2013.01); *C08L 2201/02* (2013.01); *C08L 2207/324* (2013.01); *C08L 2310/00* (2013.01)

(56) References Cited

U.S. PATENT DOCUMENTS

| | | |
|---|---|---|
| 2010/0249286 A1 | 9/2010 | Yamaki et al. |
| 2018/0002606 A1 | 1/2018 | Kamimoto et al. |

FOREIGN PATENT DOCUMENTS

| | | |
|---|---|---|
| JP | 2016003248 A | 1/2016 |
| JP | 2017031351 A | 2/2017 |
| WO | 2005080494 A1 | 9/2005 |
| WO | 2009063732 A1 | 5/2009 |
| WO | 2016125612 A1 | 8/2016 |

OTHER PUBLICATIONS

International Search Report dated Sep. 11, 2018, from corresponding PCT application No. PCT/JP2018/025407.
Extended European Search Report issued in European Patent Application No. 18 82 9102.5 dated Dec. 21, 2020, 5 pages.

* cited by examiner

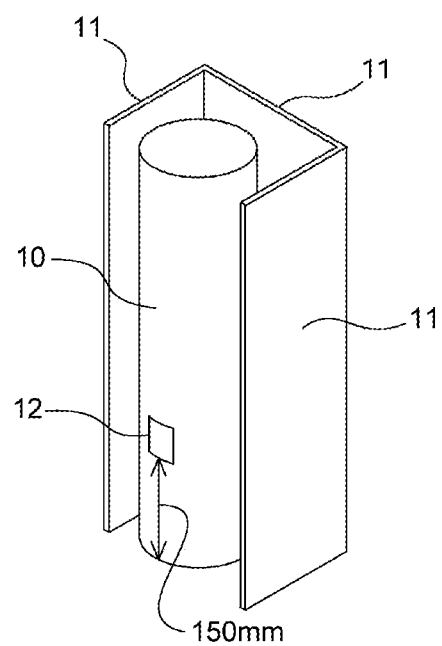

FLAME RETARDANT COMPOSITION AND FLAME-RETARDANT RESIN COMPOSITION CONTAINING SAME

TECHNICAL FIELD

The present invention relates to a flame-retardant composition and a flame-retardant resin composition containing the same.

BACKGROUND ART

Synthetic resins have been applied widely to constructional materials, automotive parts, packaging materials, agricultural materials, housings of appliances, toys, and so forth because of their excellent molding properties, heat resistance, and mechanical characteristics as well as their low specific gravity and light weight. Most of synthetic resins are combustible and need to be rendered flame-retardant for some applications. In particular, those having high combustibility, such as polyolefin resins, have been used in a broad range of fields, and it is absolutely necessary to incorporate a flame retardant to them to make them flame-retardant.

It is well known that flame retardation of synthetic resins is achieved by using halogen flame retardants; inorganic phosphorus flame retardants, including red phosphorus and polyphosphoric acid compounds, such as ammonium polyphosphates; organic phosphorus flame retardants typified by triarylphosphoric ester compounds; metal hydroxides, such as magnesium hydroxide; antimony oxide, which is a flame retardant synergist; and melamine compounds, either alone or as a combination thereof. However, the use of a halogen flame retardant has the problem of harmful gas emission on combustion. The problem with the use of a metal hydroxide is that sufficient flame retardation is not obtained unless it is added in large quantities, and addition of such a large quantity of a metal hydroxide results in reduction of resin moldability and physical properties of molded products. Hence, use of a phosphorus flame retardant has been attempted. For example, patent literature 1 listed below discloses a flame retardant composition containing a phosphoric acid salt and a silicone oil having a viscosity of 5000 mm$^2$/s or less.

The flame retardant composition according to patent literature 1, while capable of imparting high flame retardancy to synthetic resin compositions, has room for reducing smoking from the flame-retardant synthetic resin composition containing the same when burning. Patent literature 1 gives no considerations to the reduction of smoke generated on combustion. Seeing that a low-viscosity oil is generally considered to increase the amount of smoke due to its high volatility, patent literature 1 neither describes nor suggests that a combined use of a specific phosphate and a specific oil might reduce smoking on combustion. In addition to this, patent literature 1 neither describes nor suggests that a combined use of a specific phosphate and a specific oil might reduce dust production.

CITATION LIST

Patent Literature

Patent literature 1: US 20070176154(A1)

SUMMARY OF INVENTION

An object of the present invention is to provide a flame retardant composition capable of providing a resin composition that exhibits good flame retardancy and is yet low dusting and low smoking when burning and a flame-retardant resin composition that is excellent in flame retardancy, low dusting, and low smoking upon combustion.

As a result of intensive investigations, the inventors have found that a flame retardant composition composed of a specific phosphate combined with a specific oil in a specific ratio provides, when incorporated to a resin, a resin composition having excellent flame retardancy and being prevented from dusting and generating smoke on combustion. The present invention has been completed on the basis of this finding.

The present invention provides in its first aspect a flame retardant composition containing (A) a piperazine phosphate. (B) a melamine phosphate, and (C) an oil having a siloxane bond and a specific gravity of 0.930 to less than 0.970 at 25° C. Component (C) is present in an amount of 0.01 to 5 parts by mass per 100 parts by mass of the sum of components (A) and (B).

In a first preferred embodiment of the first aspect of the present invention, component (A) mainly comprises piperazine pyrophosphate, component (B) mainly comprises melamine pyrophosphate, and the mass ratio of components (A) to (B) is 90:10 to 50:50.

In a second preferred embodiment of the first aspect of the present invention, the flame retardant composition further contains (D) a methylhydrogen silicone oil having hydrogen in a part of the side chains of polysiloxane and a specific gravity of 0.970 to less than 1.01 at 25° C. in an amount of 0.01 to 5 parts by mass per 100 parts by mass of the sum of components (A) and (B).

In a third preferred embodiment of the first aspect of the present invention, the flame retardant composition further contains (E) 0.01 to 5 parts by mass, per 100 parts by mass of the sum of components (A) and (B), of hydrotalcite.

The present invention also provides in its second aspect a flame-retardant resin composition containing 100 parts by mass of a resin and 10 to 400 parts by mass of the flame retardant composition according to the first aspect of the present invention.

The present invention also provides in its third aspect a molded article obtained from the flame-retardant resin composition according to the second aspect of the present invention.

BRIEF DESCRIPTION OF DRAWINGS

FIG. 1 is a perspective schematically illustrating the tool used in testing the flame-retardant compositions prepared in Examples and Comparative Examples to evaluate the dusting properties.

DESCRIPTION OF EMBODIMENTS

The present invention relates to a flame retardant composition and a flame-retardant resin composition. The present invention will be described on the basis of its preferred embodiments.

[I] Flame Retardant Composition

The flame retardant composition of the present invention essentially contains (A) a piperazine phosphate. (B) a melamine phosphate, and (C) an oil having a siloxane bond and a specific gravity of 0.930 to less than 0.970 at 25° C.

Component (A):

The flame retardant composition of the present invention contains at least one piperazine phosphate, which is a salt between a phosphoric acid and piperazine. As used herein, the term "phosphoric acid" is a generic term for monophosphoric acids and polyphosphoric acids. Monophosphoric acids are exemplified by orthophosphoric acid ($H_3PO_4$). Examples of the polyphosphoric acids include pyrophosphoric acid ($H_4P_2O_7$)(also known as diphosphoric acid), triphosphoric acid ($H_5P_3O_{10}$), and metaphosphoric acid ($HPO_3)_k$ (k stands for a positive integer of 4 to 20) as a kind of condensed phosphoric acids.

The piperazine phosphate of the flame retardant composition of the present invention preferably mainly comprises piperazine pyrophosphate. By saying "mainly comprise piperazine pyrophosphate", it is meant that a piperazine phosphate other than piperazine pyrophosphate, such as piperazine orthophosphate, is not used intentionally. More specifically, piperazine pyrophosphate can sometimes contain other piperazine phosphates, such as piperazine orthophosphate, as a by-product. In such a case, the ratio of the other piperazine phosphates in the piperazine pyrophosphate which is intended to be used alone should be not more than 10 mass %, preferably 7 mass % or less.

While the phosphoric acid to piperazine molar ratio in the piperazine phosphate is not particularly limited, it is preferably 1:1.

The content of the piperazine phosphate in the flame retardant composition of the present invention is determined by, for example, ion chromatography.

Component (B):

The flame retardant composition of the present invention contains at least one melamine phosphate, which is a salt between a phosphoric acid and melamine.

As used herein, the term "phosphoric acid" is a generic term for monophosphoric acids and polyphosphoric acids. Monophosphoric acids are exemplified by orthophosphoric acid ($H_3PO_4$). Examples of the polyphosphoric acids include pyrophosphoric acid ($H_4P_2O_7$)(also known as diphosphoric acid), triphosphoric acid ($H_5P_3O_{10}$), and metaphosphoric acid ($HPO_3)_k$ (k stands for a positive integer of 4 to 20) as a kind of condensed phosphoric acids.

The melamine phosphate of the flame retardant composition of the present invention preferably mainly comprises melamine pyrophosphate. By saying "mainly comprises melamine pyrophosphate", it is meant that a melamine phosphate other than melamine pyrophosphate, such as melamine orthophosphate, is not used intentionally. More specifically, melamine pyrophosphate can sometimes contain other melamine phosphates, such as melamine orthophosphate, as a by-product. In such a case, the ratio of the other melamine phosphates in the melamine pyrophosphate which is intended to be used alone should be not more than 10 mass %, preferably 7 mass % or less.

While the phosphoric acid to melamine molar ratio in the melamine phosphate is not particularly limited, it is preferably 1:2.

The content of the melamine phosphate in the flame retardant composition of the present invention is determined by, for example, ion chromatography.

The mass ratio of components (A) to (B) in the flame retardant composition of the present invention is preferably 90:10 to 50:50, more preferably 85:15 to 55:45, even more preferably 80:20 to 60:40, in view of flame retardation and reduction of smoking and dusting.

Component (C):

The flame retardant composition of the present invention contains at least one oil having a siloxane bond and a specific gravity of 0.930 to less than 0.970 at 25° C. Compounding the flame retardant composition of the present invention, which is composed of components (A), (B), and (C) in the ratio hereinafter described, into a resin provides a resin composition that exhibits good flame retardancy and is prevented from dusting and from smoking on combustion.

The specific gravity of the oil (C) is preferably 0.940 to less than 0.969, more preferably 0.95 to less than 0.965, in view of flame retardation and reduction of smoking and dusting. The specific gravity of the oil (C) can be measured by, for example, the method specified in JIS Z8804.

The oil having a siloxane bond is preferably an oil having a methylpolysiloxane structure, more preferably an oil having a dimethylpolysiloxane structure. The oil having a siloxane bond may be the one modified by at least one of epoxy modification, carboxy modification, carbinol modification, and amino modification.

The oil used as component (C) may be a commercially available product, such as KF-96-20cs, KF-96-50cs, and KF-96-100cs, all from Shin-Etsu Silicone Co., Ltd.

The content of component (C) in the flame retardant composition of the present invention is 0.01 to 5 parts by mass per 100 parts by mass of the sum of components (A) and (B). The flame retardant composition containing component (C) in the above ratio provides a resin composition having good flame retardancy, low dusting, and low smoking on combustion. To further enhance the effects of the present invention, the content of component (C) is preferably 0.05 to 3 parts, more preferably 0.1 to 1 part, by mass per 100 parts by mass of the sum of components (A) and (B). If the content of component (C) is less than 0.01 part by mass, the flame retardant composition can fail to exhibit flame retardation performance. If it exceeds 5 parts by mass, the flame retardant composition can contaminate the processing machine in the preparation of the composition. The content of component (C) in the flame retardant composition of the present invention is determined by, for example, liquid chromatography or NMR analysis.

Component (D):

The flame retardant composition of the present invention preferably contains a methylhydrogen silicone oil having hydrogen in a part of the side chains of polysiloxane and a specific gravity of 0.970 to less than 1.01 at 25° C. in view of flame retardancy, low smoking properties, and low dusting properties. The specific gravity of the methylhydrogen silicone oil (D) can be measured by, for example, the method specified in JIS Z8804.

The content of the methylhydrogen silicone oil in the flame retardant composition of the present invention is preferably 0.01 to 5 parts, more preferably 0.05 to 3 parts, even more preferably 0.1 to 1 part, by mass per 100 parts by mass of the sum of components (A) and (B) in view of flame retardancy, low smoking properties, and low dusting properties. With the content of the methylhydrogen silicone oil being within the above range, the flame retarding performance, smoke reducing effect, and dust reducing effect are produced effectively, and contamination of a processing machine is prevented in the preparation of the composition. The content of component (D) in the flame retardant composition of the present invention is measured by, for example, liquid chromatography or NMR analysis.

The methylhydrogen silicone oil (D) may be a commercially available product, such as KF-99 and KF9901, both from Shin-Etsu Silicone Co., Ltd.

Component (E):

The flame retardant composition of the present invention preferably contains hydrotalcite in view of flame retardation and reduction of smoking and dusting.

The content of hydrotalcite as component (E) is preferably 0.01 to 5 parts, more preferably 0.05 to 3 parts, even more preferably 0.1 to 1 part, by mass per 100 parts by mass of the sum of components (A) and (B). With the content of component (E) being in that range, the flame retarding performance, smoke reducing effect, and dust reducing effect are produced effectively, and a resin compounded with the flame retardant composition of the present invention will produce molded articles with a better appearance.

Hydrotalcite is a complex salt compound composed of magnesium, aluminum, hydroxyl groups, a carbonic group, and optionally crystallization water, which is known as naturally occurring or synthetic. In the flame retardant composition of the present invention, the hydrotalcite may have part of magnesium or aluminum displaced with other metals, such as alkali metals and zinc, or may have its hydroxyl group or carbonic group displaced with other anionic groups. Water of crystallization of the hydrotalcite may be removed. The hydrotalcite may be coated with a higher fatty acid (e.g., stearic acid), a higher fatty acid metal salt (e.g., alkali metal oleate), an organic sulfonic acid metal salt (e.g., alkali metal dodecylbenzenesulfonate), a higher fatty acid amide, a higher fatty acid ester, or a wax. Hydrotalcite may be used irrespective of their crystal structure, crystal grain size, and the like. In the flame retardant composition of the present invention, known hydrotalcite products may be used without particular limitation. In the flame retardant composition of the present invention, commercially available hydrotalcite products may be used, including DHT-4A, Alkamizer-1, Alcamizer-2, Alcamizer-4, Alcamizer-7, HT-1, HT-7, and HT-P (all from Kyowa Chemical Industry Co., Ltd.); and NAOX-19, NAOX-19T, NAOX-33, NAOX-54, NAOX-55, NAOX-56, NAOX-57, NAOX-71, NAOX-72, NAOX-81, NAOX-91, OPTIMA-LSA, OPTIMA-XT, and MAGGOLD (all from Toda Kogyo Corp.). DHT-4 is suitable among them. These hydrotalcite compounds may be used either individually or in combination of two or more thereof.

The content of hydrotalcite in the flame retardant composition of the present invention can be measured by ICP-OES, IR spectroscopy, and the like.

Specific examples of the flame retardant composition of the present invention include the following compositions numbered 1 through 20 (all the compounding ratios are given in parts by mass). These examples are given for illustrative purposes only but not for limitation, and any composition containing (A) the piperazine phosphate, (B) the melamine phosphate, and (C) the oil having a siloxane bond and a specific gravity of 0.930 to less than 0.970 at 25° C. is useful as the flame retardant composition of the present invention.

TABLE 1

| | | Flame Retardant Composition | | | | | | | | | | | | |
|---|---|---|---|---|---|---|---|---|---|---|---|---|---|
| | | No. 1 | No. 2 | No. 3 | No. 4 | No. 5 | No. 6 | No. 7 | No. 8 | No. 9 | No. 10 | No. 11 | No. 12 | No. 13 |
| Component (A) | piperazine polyphosphate | 80 | 70 | 60 | 50 | | | | | | | | | |
| | piperazine pyrophosphate | | | | | 80 | 70 | 60 | 50 | | | | 60 | 60 |
| | piperazine orthophosphate | | | | | | | | | 80 | 70 | 50 | | |
| Component (B) | melamine polyphosphate | 20 | 30 | 40 | 50 | | | | | | | | | |
| | melamine pyrophosphate | | | | | 20 | 30 | 40 | 50 | | | | 40 | 40 |
| | melamine orthophosphate | | | | | | | | | 20 | 60 | 50 | | |
| Component (C) | C-1*[1] | 0.3 | | | 0.3 | 0.3 | | | | 0.3 | | | 0.3 | |
| | C-2*[2] | | 0.3 | | | | 0.3 | | 0.3 | | 0.3 | | | 0.3 |
| | C-3*[3] | | | 0.3 | | | | 0.3 | | | | 0.3 | | |

*[1] Oil having a siloxane bond and a specific gravity of 0.965 (KF-96-100cs, from Shin-Etsu Silicone)
*[2] Oil having a siloxane bond and a specific gravity of 0.960 (KF-96-50cs, from Shin-Etsu Silicone)
*[3] Oil having a siloxane bond and a specific gravity of 0.950 (KF-96-20cs, from Shin-Etsu Silicone)

TABLE 2

| | | Flame Retardant Composition | | | | | | | | | | | | | |
|---|---|---|---|---|---|---|---|---|---|---|---|---|---|---|
| | | No. 14 | No. 15 | No. 16 | No. 17 | No. 18 | No. 19 | No. 20 | No. 21 | No. 22 | No. 23 | No. 24 | No. 25 | No. 26 | No. 27 |
| Component (A) | piperazine polyphosphate | | | | | | 70 | | | | | | | 70 | |
| | piperazine pyrophosphate | 80 | 60 | | 60 | 60 | | 50 | 80 | 60 | | 60 | 60 | | 50 |
| | piperazine orthophosphate | | | 50 | | | | | | | 50 | | | | |
| Component (B) | melamine polyphosphate | 20 | | | | | | | 20 | | | | | | |
| | melamine pyrophosphate | 40 | 40 | 50 | 40 | 40 | | | | 40 | 50 | 40 | 40 | | |
| | melamine orthophosphate | | | | | | 30 | 50 | | | | | | 30 | 50 |

TABLE 2-continued

| | | Flame Retardant Composition | | | | | | | | | | | | | |
|---|---|---|---|---|---|---|---|---|---|---|---|---|---|---|
| | | No. 14 | No. 15 | No. 16 | No. 17 | No. 18 | No. 19 | No. 20 | No. 21 | No. 22 | No. 23 | No. 24 | No. 25 | No. 26 | No. 27 |
| Component (C) | C-1*[1] | | 0.3 | | | 0.3 | | | | 0.3 | | | | 0.3 | |
| | C-2*[2] | 0.3 | | 0.3 | 0.3 | | | | 0.3 | | 0.3 | | 0.3 | | |
| | C-3*[3] | | | | | | 0.3 | 0.3 | | | | 0.3 | | | 0.3 |
| Component (D) | D-1*[4] | 0.3 | 0.3 | | 0.3 | 0.3 | | | 0.3 | 0.3 | | 0.3 | 0.3 | | |
| | D-2*[5] | | | 0.3 | | | | 0.3 | | | 0.3 | | | | 0.3 |
| Component (E) | E-1*[6] | | | | | | | 0.4 | | 0.4 | | | | 0.4 | 0.4 |
| | E-2*[7] | | | | | | | | | | 0.4 | 0.4 | 0.4 | | |

*[4] Methylhydrogen silicone oil having a specific gravity of 1.00 (KF-99, from Shin-Etsu Silicone)
*[5] Methylhydrogen silicone oil having a specific gravity of 1.00 (KF-9901, from Shin-Etsu Silicone)
*[6] Alkamizer 7 (from Kyowa Chemical Industry)
*[7] DHT-4A (from Kyowa Chemical Industry)

Where necessary, the flame retardant composition of the present invention may contain a phenolic, phosphite, or thioether antioxidant or other antioxidants, a nucleating agent, a lubricant, an ultraviolet absorber, a light stabilizer, other flame retardants, a plasticizer, a filler, a fatty acid metal salt, an antistatic, a pigment, a dye, and so forth, provided that it contains the piperazine phosphate (A), the melamine phosphate (B), and the oil (C) having a siloxane bond and a specific gravity of 0.930 to less than 0.970 at 25° C. in the ratio recited above. These additive components may previously be incorporated into the flame retardant composition of the present invention or be added in the preparation of the flame-retardant resin composition hereinafter described.

Examples of the phenolic antioxidant include 2,6-di-t-butyl-4-methylphenol, 2,6-di-t-butyl-4-ethylphenol, 2-t-butyl-4,6-dimethylphenol, styrenated phenol, 2,2'-methylenebis(4-ethyl-6-t-butylphenol), 2,2'-thiobis(6-t-butyl-4-methylphenol), 2,2'-thiodiethylene-bis[3-(3,5-di-t-butyl-4-hydroxyphenyl)propionate], 2-methyl-4,6-bis(octylsulfanylmethyl)phenol, 2,2'-isobutylidenebis(4,6-dimethylphenol), isooctyl-3-(3,5-di-t-butyl-4-hydroxyphenyl)propionate, N,N'-hexane-1,6-diylbis[3-(3,5-di-t-butyl-4-hydroxyphenyl)propionamide], 2,2'-oxamidebis[ethyl-3-(3,5-di-t-butyl-4-hydroxyphenyl)propionate], 2-ethylhexyl-3-(3',5'-di-t-butyl-4'-hydroxyphenyl)propionate, 2,2'-ethylene-bis(4,6-di-t-butylphenol), 3,5-di-t-buyl-4-hydroxybenzene propanoic acid C13-15 alkyl esters, 2,5-di-t-amylhydroquinone, a hindered phenol polymer (AO.OH.98, manufactured by ADEKA Palmamle SAS), 2,2'-methylenebis[6-(1-methylcyclohexyl)-p-cresol], 2-t-butyl-6-(3-t-butyl-2-hydroxy-5-methylbenzyl)-4-methylphenyl acrylate, 2-[1-(2-hydroxy-3,5-di-t-pentylphenyl)ethyl]-4,6-di-t-pentylphenyl acrylate, 6-[3-(3-t-butyl-4-hydroxy-5-methyl)propoxy]-2,4,8,10-tetra-t-butylbenz[d,f][1,3,2]-dioxaphos phepin, hexamethylenebis[3-(3,5-di-t-butyl-4-hydroxyphenyl)propionate, calcium bis[monoethyl(3,5-di-t-butyl-4-hydroxybenzyl)phosphonate], a reaction product between 5,7-bis(1,1-dimethylethyl)-3-hydroxy-2(3H)-benzofuranone and o-xylene, 2,6-di-t-butyl-4-(4,6-bis(octylthio)-1,3,5-triazin-2-ylamino)phenol, DL-α-tocopherol (vitamin E), 2,6-bis(α-methylbenzyl)-4-methylphenol, bis[3,3-bis(4'-hydroxy-3'-t-butylphenyl)butanoic acid] glycol ester, 2,6-di-t-butyl-p-cresol, 2,6-diphenyl-4-octadecyloxyphenol, stearyl (3,5-di-t-butyl-4-hydroxyphenyl)propionate, distearyl (3,5-di-t-butyl-4-hydroxybenzyl) phosphonate, tridecyl-3,5-t-butyl-4-hydroxybenzylthioacetate, thiodiethylenebis[(3,5-di-t-butyl-4-hydroxyphenyl)propionate), 4,4'-thiobis(6-t-butyl-m-cresol), 2-octylthio-4,6-di(3,5-di-t-butyl-4-hydroxyphenoxy)-s-triazine, 2,2'-methylenebis(4-methyl-6-t-butylphenol), bis[3,3-bis(4-hydroxy-3-t-butylphenyl)butyric acid] glycol ester, 4,4'-butylidenebis(2,6-di-t-butylphenol), 4,4'-butylidene-bis(6-t-butyl-3-methylphenol), 2,2'-ethylidenebis(4,6-di-t-butylphenol), 1,1,3-tris(2-methyl-4-hydroxy-5-t-butylphenyl)butane, his[2-t-butyl-4-methyl-6-(2-hydroxy-3-t-butyl-5-methylbenzyl)phenyl] terephthalate, 1,3,5-tris(2,6-dimethyl-3-hydroxy-4-t-butylbenzyl) isocyanurate, 1,3,5-tris(3,5-di-t-butyl-4-hydroxybenzyl) isocyanurate, 1,3,5-tris(3,5-di-t-butyl-4-hydroxybenzyl)-2,4,6-trimethylbenzene, 1,3,5-tris[(3,5-di-t-butyl-4-hydroxyphenyl)propionyloxyethyl] isocyanurate, tetrakis[methylene-3-(3',5'-di-t-butyl-4'-hydroxyphenyl)propionate]methane, 2-t-butyl-4-methyl-6-(2-acryloyloxy-3-t-butyl-5-methylbenzyl)phenol, 3,9-bis[2-[3-(3-t-butyl-4-hydroxy-5-methylphenyl)propanoyloxy]-1,1-dimethylethyl]-2,4,8,10-tetraoxaspiro[5,5]undecane, triethylene glycol bis(3-t-butyl-4-hydroxy-5-methylphenyl) propionate, and 3-(3,5-dialkyl-4-hydroxyphenyl)propionic acid derivatives, such as stearyl-3-(3,5-di-tert-butyl-4-hydroxyphenyl)propionamide, palmityl-3-(3,5-di-tert-butyl-4-hydroxyphenyl)propionamide, myristyl-3-(3,5-di-tert-butyl-4-hydroxyphenyl)propionamide, and lauryl-3-(3,5-di-tert-butyl-4-hydroxyphenyl)propionamide. These phenolic antioxidants may be used either individually or in combination thereof.

The phenolic antioxidant content in the flame retardant composition is selected from the range that does not impair the effects of the present invention and is preferably 0.001 to 5 parts, more preferably 0.01 to 1.0 part, by mass per 100 parts by mass of the flame retardant composition.

Examples of the phosphite antioxidant include triphenyl phosphite, diisooctyl phosphite, heptakis(dipropylene glycol) triphosphite, triisodecyl phosphite, diphenyl isooctyl phosphite, diisooctyl phenyl phosphite, diphenyl tridecyl phosphite, triisooctyl phosphite, trilauryl phosphite, diphenyl phosphite, tris(dipropylene glycol) phosphite, diisodecyl pentaerythritol diphosphite, dioleyl hydrogen phosphite, trilauryl trithiophosphite, bis(tridecyl) phosphite, tris(isodecyl) phosphite, tris(tridecyl) phosphite, diphenyldecyl phosphite, dinonylphenyl-bis(nonylphenyl) phosphite, poly(dipropylene glycol)phenyl phosphite, tetraphenyldipropylene glycol diphosphite, trisnonylphenyl phosphite, tris(2,4-di-t-butylphenyl) phosphite, tris(2,4-di-t-butyl-5-methylphenyl) phosphite, tris[2-t-butyl-4-(3-t-butyl-4-hydroxy-5-methylphenylthio)-5-methylphenyl] phosphite, tri(decyl) phosphite, octyldiphenyl phosphite, di(decyl) monophenyl phosphite, distearyl pentaerythritol diphosphite, a mixture of distearyl pentaerythritol and calcium stearate, alkyl(C10) bisphenol-A phosphite, di(tridecyl)pentaerythritol diphosphite, di(nonylphenyl) pentaerythritol diphosphite, bis(2,4-di-t-butylphenyl) pentaerythritol diphosphite, bis(2,6-di-t-butyl-4-methylphenyl) pentaerythritol diphosphite, bis(2,4,6-tri-t-butylphenyl) pentaerythritol diphosphite, bis(2,4-dicumylphenyl) pentaerythritol diphosphite, tetraphenyl-tetra(tridecyl)pentaerythritol tetraphosphite, bis(2,4-di-t-butyl-6-methylphenyl)ethyl phosphite, tetra(tridecyl)isopropylidenediphenol diphosphite, tetra(tridecyl)-4,4'-n-butylidenebis(2-t-butyl-5-methylphenol) diphosphite, hexa(tridecyl)-1,1,3-tris(2-methyl-4-hydroxy-5-t-butylphenyl)butane triphosphite, tetrakis(2,4-di-t-butylphenyl)biphenylene diphosphonite, 9,10-dihydro-9-oxa-10-phosphaphenanthrene-10-oxide, (1-methyl-1-propenyl-3-ylidene)-tris(1,1-dimethylethyl)-5-methyl-4,1-phenylene)hexatridecyl phosphite, 2,2'-methylenebis(4,6-butylphenyl)-2-ethylhexyl phosphite, 2,2'-methylenebis(4,6-di-t-butylphenyl)octadecyl phosphite, 2,2'-ethylidenebis (4,6-di-t-butylphenyl) fluorophosphite, 4,4'-butylidenebis(3-methyl-6-t-butylphenylditridecyl) phosphite, tris(2-[(2,4,8,10-tetrakis-t-butyldibenzo[d,f][1,3,2]dioxaphosphepin-6-yl) oxy]ethyl)amine, 3,9-bis(4-nonylphenoxy)-2,4,8,10-tetraoxa-3,9-diphosphaspiro[5,5]undecane, 2,4,6-tri-t-butylphenyl-2-butyl-2-ethyl-1,3-propanediol phosphite, 4,4'-isopropylidenediphenol C12-15 alcohol phosphites, 3,9-bis(2,6-di-t-butyl-4-methylphenyl)-3,9-bis-diphospha-2,4,8,10-tetraoxa-3,9-diphosphespiro[5,5]undecane, diphenyl isodecyl phosphite, and biphenyl diphenyl phosphite. These phosphite antioxidants may be used either individually or in combination.

The phosphite antioxidant content of the flame retardant composition is selected from the range that does not impair the effects of the present invention and is preferably 0.001 to 5 parts, more preferably 0.01 to 1.0 part, by mass per 100 parts by mass of the flame retardant composition.

Examples of the thioether antioxidant include 3,3'-thiodipropionic acid, alkyl(C12-C14)thiopropionic acid, di(lauryl)-3,3'-thiodipropionate, ditridecyl 3,3'-thiodipropionate, di(myristyl)-3,3'-thiodipropionate, di(stearyl)-3,3'-thiodipropionate, di(octadecyl)-3,3'-thiodipropionate, lauryl stearyl thiodipropionate, tetrakis[methylene-3-(dodecylthio) propionate]methane, thiobis(2-tert-butyl-5-methyl-4,1-phenylene)bis(3-(dodecylthio)propionate), 2,2'-thiodiethylenebis(3-aminobutenoate), 4,6-bis(octylthiomethyl)-o-cresol, 2,2'-thiodiethylenebis[3-(3,5-di-tert-butyl-4-hydroxyphenyl)propionate], 2,2'-thiobis(4-methyl-6-tert-butylphenol), 2,2'-thiobis(6-tert-butyl-p-cresol), 2-ethylhexyl-(3,5-di-tert-butyl-4-hydroxybenzyl) thioacetate, 4,4'-thiobis(6-tert-butyl-3-methylphenol), 4,4'-thiobis(4-methyl-6-tert-butylphenol), 4,4'-[thiobis(methylene)]bis(2-tert-butyl-6-methyl-1-hydroxybenzyl), bis(4,6-di-tert-butylphenol-2-yl) sulfide, tridecyl-3,5-di-tert-butyl-4-hydroxybenzylthioacetate, 1,4-bis(octylthiomethyl)-6-methylphenol, 2,4-bis(dodecylthiomethyl)-6-methylphenol, distearyl-disulfide, and bis(methyl-4-[3-n-alkyl(C12/C14)thiopropionyloxy]-5-tert-butylphenyl) sulfide. These thioether antioxidants may be used either individually or in combination.

The thioether antioxidant content of the flame retardant composition is selected from the range that does not impair the effects of the present invention and is preferably 0.001 to 5 parts, more preferably 0.01 to 1.0 part, by mass per 100 parts by mass of the flame retardant composition.

Examples of the other antioxidants include nitrone compounds, such as N-benzyl-α-phenylnitrone. N-ethyl-α-methylnitrone, N-octyl-α-heptylnitrone, N-lauryl-α-undecylnitrone, N-tetradecyl-α-tridecylnitrone, N-hexadecyl-α-pentadecylnitrone, N-octyl-α-heptadecylnitrone, N-hexadecyl-α-heptadecylnitrone, N-octadecyl-α-pentadecylnitrone, N-heptadecyl-α-heptadecylnitrone, and N-octadecyl-α-heptadecylnitrone; and benzofuran compounds, such as 3-arylbenzofuran-2(3H)-one, 3-(alkoxyphenyl)benzofuran-2-ones, 3-(acyloxyphenyl)benzofuran-2(3H)-ones, 5,7-di-tert-butyl-3-(3,4-dimethylphenyl)-benzofuran-2(3H)-one, 5,7-di-tert-butyl-3-(4-hydroxyphenyl)-benzofuran-2(3H)-one, 5,7-di-t-butyl-3-{4-(2-hydroxy)phenyl}-benzofuran-2(3H)-one, 6-(2-(4-(5,7-di-tert-2-oxo-2,3-dihydrobenzofurn-3-yl)phenoxy)ethoxy)-6-oxohexyl 6-((6-hydroxyhexanoyl)oxy)hexanoate, and 5-di-tert-butyl-3-(4-((15-hydroxy-3,6,9,13-tetraoxapentadecyl)oxy)phenyl) benzofuran-2(3H)-one. These other antioxidants may be used either individually or in combination thereof.

The content of the other antioxidants in the flame retardant composition of the present invention is selected from the range that does not impair the effects of the present invention and is preferably 0.001 to 5 parts, more preferably 0.01 to 1.0 part, by mass per 100 parts by mass of the flame retardant composition.

Examples of the nucleating agent include metal carboxylates, such as sodium benzoate, aluminum 4-tert-butylbenzoate, sodium adipate, and disodium bicyclo[2.2.1]heptane-2,3-dicaboxylate; phosphoric ester metal salts, such as sodium bis(4-tert-butylphenyl) phosphate, sodium 2,2'-methylenebis(4,6-di-tert-butylphenyl) phosphate, and lithium 2,2'-methylenebis(4,6-di-tert-butylphenyl) phosphate; polyhydric alcohol derivatives, such as dibenzylidene sorbitol, bis(methylbenzylidene)sorbitol, bis(3,4-dimethylbenzylidene)sorbitol, bis(p-ethylbenzylidene)sorbitol, bis (dimethylbenzylidene) sorbitol, 1,2,3-trideoxy-4,6:5,7-bis-O-((4-propylphenyl)methylene)-nonitol, 1,3:2,4-bis(p-methylbenzyl idene) sorbitol, and 1,3:2,4-bis-O-benzylidene-D-glucitol (dibenzylidene sorbitol); and amide compounds, such as N,N',N''-tris[2-methylcyclohexyl]-1,2,3-propanetricarboxamide, N,N',N''-tricyclohexyl-1,3,5-benzenetricarboxamide, N,N'-dicyclohexyl-naphthalenedicarboxamide, and 1,3,5-tri(dimethylisopropylamino)benzene. These nucleating agents may be used either individually or in combination thereof.

The content of the nucleating agent in the flame retardant composition of the present invention is selected from the range that does not impair the effects of the present invention and is preferably 0.001 to 5 parts, more preferably 0.01 to 1.0 part, by mass per 100 parts by mass of the flame retardant composition.

Examples of the lubricant include hydrocarbon lubricants, such as low molecular waxes, paraffin wax, polyethylene wax, chlorinated hydrocarbons, and fluorocarbons; natural waxes, such as carnauba wax and candelilla wax; fatty acid-based lubricants, including higher fatty acids, such as lauric acid, stearic acid, and behenic acid, and hydroxy fatty acids, such as hydroxystearic acid; aliphatic amide lubricants, including aliphatic amide compounds, such as stearamide, lauramide, and oleamide, and alkylenebis aliphatic amide compounds, such as methylenebisstearamide and ethylenebisstearamide; fatty acid alcohol ester lubricants, including fatty acid monohydric alcohol esters, such as stearyl stearate, butyl stearate, and distearyl phthalate, fatty acid polyhydric alcohol esters, such as glycerol tristearate, sorbitol tristearate, pentaerythritol tetrastearate, dipentaerythritol hexastearate, polyglycerol polyricinoleate, and hydrogenated castor oil, and complex esters formed from a monobasic fatty acid, a polybasic organic acid, and a polyhydric alcohol, such as dipentaerythritol adipate stearate; aliphatic alcohol lubricants, such as stearyl alcohol, lauryl alcohol, and palmityl alcohol; metal soaps formed from aliphatic alcohols and metals, such as alkaline earth metals, titanium, zirconium, iron, cobalt, nickel, copper, zinc, and aluminum; montanoic acid derivative lubricants, such as partially saponified montanoic esters; acrylic lubricants; and silane coupling lubricants.

Examples of the silane coupling agents include alkenyl-functional silane coupling agents, such as vinyltrimethoxysilane (e.g., KBM-1003 from Shin-Etsu Chemical, A-171 from Momentive Performance Materials Japan. Z-6300 from Dow Corning Toray Co., Ltd., GENIOSIL XL10 from Wacker Asahikasei Silicone Co., Ltd., and Sila Ace S210 from Nichibi Trading Co., LTD.), vinyltriethoxysilane (e.g., KBE-10003 from Shin-Etsu Chemical, A-151 from Momentive Performance Materials Japan, Z-6519 from Dow Corning Toray, GENIOSIL GF56 from Wacker Asahikasei Silicone, and Sila Ace S220 from Nichibi Trading), vinyltriacetoxysilane (e.g., GENIOSIL GF62 from Wacker Asahikasei Silicone), vinyltris(2-methoxyethoxy)silane (e.g., A-172 from Momentive Performance Materials Japan), vinylmethyldimethoxysilane (e.g., A-2171 from Momentive Performance Materials Japan and GENIOSIL XL12 from Wacker Asahikasei Silicone), octenyltrimethoxysilane (e.g., KBM-1083 from Shin-Etsu Chemical), allyltrimethoxysilane (e.g., Z-6825 from Dow Corning Toray), and p-styryltrimethoxysilane (e.g., KBM-1403 from Shin-Etsu Chemical); acryl-functional silane coupling agents, such as 3-acryloxypropyltrimethoxysilane and 3-acryloxypropyltriethoxysilane (e.g., KBM-5103 from Shin-Etsu Chemical); methacryl-functional silane coupling agents, such as 3-methacryloxypropylmethyldimethoxysilane (e.g., KBM-502 from Shin-Etsu Chemical and Z-6033 from Dow Coring Toray), 3-methacryloxypropyltrimethoxysilane (e.g., KBM-503 from Shin-Etsu Chemical, A-174 from Momentive Performance Materials Japan, Z-6030 from Dow Corning Toray, GENIOSIL GF31 from Wacker Asahikasei Silicone, and Sila Ace S710 from Nichibi Trading), 3-methacryloxypropylmethyldiethoxysilane (e.g., KBE-502 from Shin-Etsu Chemical), 3-methacryloxypropyltriethoxysilane (e.g., KBE-503 from Shin-Etsu Chemical and Y-9936 from Momentive Performance Materials Japan), and methacryloxyoctyltrimethoxysilane (e.g., KBM-5803 from Shin-Etsu Chemical); epoxy-functional silane coupling agents, such as 2-(3,4-epoxycyclohexyl)ethyltrimethoxysilane (e.g., KBM-303 from Shin-Etsu Chemical, A-186 from Momentive Performance Materials Japan, Z-6043 from Dow Corning Toray, and Sila Ace S530 from Nichibi Trading), 3-glycidoxypropylmethyldimethoxysilane (e.g., KBM-402 from Sin-Etsu Chemical, Z-6044 from Dow Corning Toray, and Sila Ace S520 from Nichibi Trading), 3-glycidoxypropyltrimethoxysilane (e.g., KBM-403 from Shin-Etsu Chemical, A-187 from Momentive Performance Materials Japan, Z-6040 from Dow Corning Toray, GENIOSIL GF80 from Wacker Asahikasei Silicone. and Sila Ace S510 from Nichibi Trading), 3-glycidoxypropylmethyldiethoxysilane (e.g., KBE-402 from Shin-Etsu Chemical), 3-glycidoxypropyltriethoxysilane (e.g., KBE-403 from Shin-Etsu Chemical, A-1871 from Momentive Performance Materials Japan. and GENIOSIL GF82 from Wacker Asahikasei Silicone, and glycidoxyoctyltrimethoxysilane (e.g., KBM-4803 from Shin-Etsu Chemical); amino-functional silane coupling agents, such as N-2-(aminoethyl)-3-aminopropylmethyldimethoxysilane (e.g., KBM-602 from Shin-Etsu Chemical, A-2120 from Momentive Performance Materials Japan. GENIOSIL GF-95 from Wacker Asahikasei Silicone, and Sila Ace S310 from Nichibi Trading), N-2-(aminoethyl)-3-aminoporopyltrimethoxysilane (e.g., KBM-603 from Shin-Etsu Chemical, A-1120 and A-1122 both from Momentive Performance Materials Japan. Z-6020 and Z-6094 both from Dow Corning Toray, GENIOSIL GF-91 from Wacker Asahikasei Silicone, and Sila Ace S320 from Nichibi Trading), 3-aminopropyltrimethoxysilane (e.g., KBM-903 from Shin-Etsu Chemical, A-1110 from Momentive Performance Materials Japan, Z-6610 from Dow Corning Toray, and Sila Ace S360 from Nichibi Trading), 3-aminopropyltriethoxysilane (e.g., KBE-903 from Shin-Etsu Chemical, A-1100 from Momentive Performance Materials Japan, Z-6011 from Dow Corning Toray, and Sila Ace S330 from Nichibi Trading), 3-triethoxysilyl-N-(1,3-dimethylbutylidene)propylamine (e.g., KBE-9103 from Shin-Etsu Chemical and Sila Ace S340 from Nichibi Trading), N-phenyl-3-aminopropyltrimethoxysilane (e.g., KBM-573 from Shin-Etsu Chemical. Y-9669 from Momentive Performance Materials Japan, and Z-6883 from Dow Corning Toray), N,N'-bis[3-(trimethoxysilyl)propyl]ethylenediamine (e.g., Sila Ace XS1003 from Nichibi Trading), and N-(vinylbenzyl)-2-aminoethyl-3-aminopropyltrimethoxysilane hydrochloride (e.g., KBM-575 from Shin-Etsu Chemical, Z-6032 from Dow Corning Toray, and Sila Ace S350 from Nichibi Trading); isocyanurate-functional silane coupling agents, such as tris(trimethoxysilylpropyl) isocyanurate (e.g., KBM-9659 from Shin-Etsu Chemical); mercapto-functional silane coupling agents, such as 3-mercaptopropylmethyldimethoxysilane (e.g., KBM-802 from Shin-Etsu Chemical and Z-6852 from Dow Corning Toray), 3-mercaptopropyltrimethoxysilane (e.g., KBM-803 from Shin-Etsu Chemical, A-189 from Momentive Performance Materials Japan, Z-6062 from Dow Corning Toray, and Sila Ace S810 from Nichibi Trading), and 3-mercaptopropyltriethoxysilane (e.g., A-1891 from Momentive Performance Materials Japan and Z-6911 from Dow Corning Toray); ureido-functional silane coupling agents, such as 3-ureidopropyltrialkoxyxysilanes (e.g., KBE-585 from Shin-Etsu Chemical), 3-ureidopropyltrimethoxysilane, and 3-ureidopropyltriethoxysilane (e.g., A-1160 from Momentive Performance Materials Japan); sulfide-functional silane coupling agents, such as bis(triethoxysilylpropyl) tetrasulfide; thioester-functional silane coupling agents, such as 3-octanoylthio-1-propyltriethoxysilane (e.g., A-LINK 599 from Momentive Performance Materials Japan): and isocyanate-functional silane coupling agents, such as 3-isocyanatopropyltriethoxysilane (e.g., KBE-9007 from Shin-Etsu Chemical and A-1310 from Momentive Performance Materials Japan) and 3-isocyanatopropyltrimethoxysilane (e.g., Y-5187 from Momentive Performance Materials Japan and GENIOSIL GF40 from Wacker Asahikasei Silicone). These lubricants may be used either individually or in combination thereof.

The lubricant content in the flame retardant composition of the present invention is selected from the range that does not impair the effects of the present invention and is preferably 0.01 to 10 parts, more preferably 0.03 to 3 parts, by mass per 100 parts by mass of the resin.

Examples of the ultraviolet absorbers include benzophenone compounds, such as 2,4-dihydroxybenzophenone, 5,5'-methylenebis(2-hydroxy-4-methoxybenzophenone), 2-hydroxy-4-n-octoxybenzophenone, 2-hydroxy-4-methoxybenzophenone, 2-hydroxy-4-dodecyloxybenzophenone, and 2,2'-dihydroxy-4-methoxybenzophenone; benzotriazole compounds, such as 2-(2-hydroxy-5-methylphenyl)benzotriazole, 2-(2-hydroxy-5-tert-octylphenyl)benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3,5-dicumylphenyl)benzotriazole, 2,2'-methylenebis(4-tert-octyl-6-benzotriazolylphenol), 2-(2-hydroxy-3-tert-butyl-5-carboxyphenyl)benzotriazole polyethylene glycol ester, 2-[2-hydroxy-3-(2-acryloyloxyethyl)-5-methylphenyl]benzotriazole, 2-[2-hydroxy-3-(2-methacryloyloxyethyl)-5-tert-butylphenyl]benzotriazole, 2-[2-hydroxy-3-(2-methacryloyloxyethyl)-5-tert-octylphenyl]benzotriazole, 2-[2-hydroxy-3-(2-methacryloyloxyethyl)-5-tert-butylphenyl]-5-chlorobenzotriazole, 2-[2-hydroxy-5-(2-methacryloyloxyethyl)phenyl]benzotriazole, 2-[2-hydroxy-3-tert-butyl-5-(2-methacryloyloxyethyl)phenyl]benzotriazole, 2-[2-hydroxy-3-tert-amyl-5-(2-methacryloyloxyethyl)phenyl]benzotriazole, 2-[2-hydroxy-3-tert-butyl-5-(3-methacryloyloxypropyl)phenyl]-5-chlorobenzotriazole, 2-[2-hydroxy-4-(2-methacryloyloxymethyl)phenyl]benzotriazole, 2-[2-hydroxy-4-(3-methacryloyloxy-2-hydroxypropyl)phenyl]benzotriazole, and 2-[2-hydroxy-4-(3-methacryloyloxypropyl)phenyl]benzotriazole; benzoates, such as phenyl salicylate, resorcinol monobenzoate, 2,4-di-tert-butylphenyl 3,5-di-tert-butyl-4-hydroxybenzoate, octyl (3,5-di-tert-butyl-4-hydroxy)benzoate, dodecyl (3,5-di-tert-butyl-4-hydroxy)benzoate, tetradecyl (3,5-di-tert-butyl-4-hydroxy)benzoate, hexadecyl (3,5-di-tert-butyl-4-hydroxy) benzoate, octadecyl (3,5-di-tert-butyl-4-hydroxy)benzoate, and behenyl (3,5-di-tert-butyl-4-hydroxy)benzoate; substituted oxanilides, such as 2-ethyl-2'-ethoxyoxanilide, 2-ethoxy-4'-dodecyloxanilide, and 2-ethyl-2'-ethoxy-5'-tert-butyloxanilide; cyanoacrylates, such as ethyl α-cyano-β,β-diphenylacrylate, methyl 2-cyano-3-methyl-3-(p-methoxyphenyl)acrylate, and tetrakis(α-cyano-β,β-diphenylacryloyloxymethyl)methane; and triazines, such as 2-(2-hydroxy-4-(2-(2-ethylhexanoyloxy)ethyloxy)-4,6-diphenyl-1,3,5-triazine, 2,4,6-tris(2-hydroxy-4-hexyloxy-3-methylphenyl)-1,3,5-triazine, 2-(2-hydroxy-4-octyloxyphenyl)-4,6-bis(2,4-dimethylphenyl)-1,3,5-triazine, 2-(4,6-diphenyl-1,3,5-triazin-2-yl)-5-hexyloxyphenol, and 2-(4,6-di(1,1'-biphenyl)-4-yl)-1,3,5-triazin-2-yl)-5-(2-ethylhexyloxy)phenol. These UV absorbers may be used either individually or in combination.

The UV absorber content in the flame retardant composition of the present invention is selected from the range that does not impair the effects of the present invention and is preferably 0.001 to 5 parts, more preferably 0.005 to 0.5 parts, by mass per 100 parts by mass of the flame retardant composition.

Examples of the light stabilizer include 2,2,6,6-tetramethyl-4-piperidyl stearate, 1,2,2,6,6-pentamethyl-4-piperidyl stearate, 2,2,6,6-tetramethyl-4-piperidyl benzoate, bis (2,2,6,6-tetramethyl-4-piperidyl) sebacate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, bis(2,2,6,6-tetramethyl-4-piperidyl)-di (tridecyl)-1,2,3,4-butanetetracarboxylate, bis(1,2,2,6,6-pentamethyl-4-piperidyl)-di(tridecyl)-1,2,3,4-butanetetracarboxylate, bis(1,2,2,4,4-pentamethyl-4-piperidyl)-2-butyl-2-(3,5-di-tert-butyl-4-hydroxybenzyl) malonate, 1-(2-hydroxyethyl)-2,2,6,6-tetramethyl-4-piperidinol/diethyl succinate polycondensates, 1,6-bis(2,2,6,6-tetramethyl-4-piperidylamino)hexane/2,4-dichloro-6-morpholino-s-triazine polycondensates, 1,6-bis(2,2,6,6-tetramethyl-4-piperidylamino)hexane/2,4-dichloro-6-tert-octylamino-s-triazine polycondensates, 1,5,8,12-tetrakis[2,4-bis(N-butyl-N-(2,2,6,6-tetramethyl-4-piperidyl)amino)-s-triazin-6-yl]-1,5,8,12-tetraazadodecane, 1,5,8,12-tetrakis[2,4-bis(N-butyl-N-(1,2,2,6,6-pentamethyl-4-piperidyl)amino)-s-triazin-6-yl]-1,5,8,12-tetraazadodecane, 1,6,11-tris[2,4-bis(N-butyl-N-(2,2,6,6-tetramethyl-4-piperidyl)amino)-s-triazin-6-yl]aminoundecane, 1,6,11-tris[2,4-bis(N-butyl-N-(1,2,2,6,6-pentamethyl-4-piperidyl)amino-s-triazin-6-yl]amino undecane, bis{4-(1-octyloxy-2,2,6,6-tetramethyl)piperidyl} decanedionate, bis{4-(2,2,6,6-tetramethyl-1-undecyloxy)piperidyl}carbonate, TINUVIN NOR 371 from Ciba Specialty Chemicals, 2,2,6,6-tetramethyl-4-piperidyl methacrylate, 1,2,3,4-butanetetracarboxylic acid, polymer with 2,2-bis(hydroxymethyl)-1,3-propanediol and 3-hydroxy-2,2-dimethylpropanal, 1,2,2,6,6-pentamethyl-4-piperidinyl ester, 1,3-bis(2,2,6,6-tetramethylpiperidin-4-yl)-2,4-ditridecylbenzene-1,2,3,4-tetracarboxylate, bis(1-octyloxy-2,2,6,6-pentamethyl-4-piperidyl) sebacate, and poly[[6-[(1,1,3,3-tetramethylbutyl)amino]-1,3,5-triazin-2,4-diyl][(2,2,6,6-tetramethyl-4-piperidinyl)imino]-1,6-hexanediyl[(2,2,6,6-tetramethyl-4-piperidinyl)imino]]). These light stabilizers may be used either individually or in combination.

The content of the light stabilizer in the flame retardant composition is selected from the range that does not impair the effects of the present invention and is preferably 0.001 to 5 parts, more preferably 0.005 to 0.5 parts, by mass per 100 parts by mass of the flame retardant composition.

Examples of the other flame retardants include halogen, phosphorus, nitrogen, and metal hydroxide flame retardants. Examples of the halogen flame retardants include chlorine flame retardants, such as tris(chloropropyl) phosphate, and bromine flame retardants, such as tris(tribromoneopentyl) phosphate, brominated bisphenol-A epoxy resin, brominated phenol novolak epoxy resin, hexabromobenzene, pentabromotoluene, ethylenebis(pentabromophenyl), ethylenebistetrabromophthalimide, 1,2-dibromo-4-(1,2-dibromoethyl) cyclohexane, tetrabromocyclooctane, hexabromocyclododecane, bis(tribromophenoxy)ethane, brominated polyphenylene ether, brominated (poly)styrene, 2,4,6-tris(tribromophenoxy)-1,3,5-triazine, tribromophenylmaleimide, tribromophenyl acrylate, tribromophenyl methacrylate, tetrabromobisphenol-A dimethacrylate, pentabromobenzyl acrylate, and commercially available products (e.g., CR-504L, CR-570, and DAIGUARD-540, all from Daihachi Chemical Ind. Co., Ltd.).

Examples of the phosphorus flame retardants include inorganic phosphorus flame retardants, such as red phosphorus; aliphatic phosphoric ester flame retardants, such as trimethyl phosphate and triethyl phosphate; and aromatic phosphoric ester flame retardants, such as triphenyl phosphate, tricresyl phosphate, trixylenyl phosphate, cresyldiphenyl phosphate, cresyl-2,6-dixylenyl phosphate, resorcinol bis(diphenyl phosphate), (1-methylethylidene)-4,1-phenylenetetraphenyl diphosphate, 1,3-phenylenetetrakis(2, 6-dimethylphenyl) phosphate, and commercially available products (e.g., ADK Stab FP-500, ADK Stab FP-600, ADK Stab FP-700, ADK Stab FP-800, and ADK Stab PFR, all from Adeka Corp.; and DAIGUARD-1000, CR-733S, CR-741, PX-200, PX-202, DAIGUARD-580, and DAIGUARD-880, all from Daihachi Chemical Ind.).

Examples of the nitrogen flame retardants include melamine cyanurate.

Examples of the metal oxide flame retardants include magnesium hydroxide and aluminum hydroxide.

The other flame retardants may be used either individually or in combination thereof. The content of the other flame retardants in the flame retardant composition of the present invention is selected from the range that does not impair the effects of the present invention and is preferably 1 to 400 parts, more preferably 3 to 200 parts, even more preferably 5 to 100 parts, by mass per 100 parts by mass of the flame retardant composition.

Examples of the flame retardant synergist include titanium oxide, aluminum oxide, magnesium oxide, talc, zeolite, montmorillonite, antimony trioxide, zinc borate, pentaerythritol, and dipentaerythritol. It is preferred for the flame retardant composition to contain zinc oxide either surface-treated or untreated. Commercially available zinc oxide products may be made use of. Examples of useful commercial products are zinc oxide JIS class I (from Mitsui Mining & Smelting Co., Ltd.), partially coated zinc oxide (from Mitsui Mining & Smelting), Nanofine 50 (ultrafine zinc oxide with an average particle size of 0.02 μm, from Sakai Chemical Industry Co., Ltd.), and Nanofine K (zinc silicate-coated ultrafine zinc oxide with an average particle size of 0.02 μm, from Sakai Chemical Industry). These flame retardant synergists may be used either alone or in combination thereof. The content of the flame retardant synergist in the flame retardant composition is selected from the range that does not impair the effects of the present invention and is preferably 0.01 to 10 parts, more preferably 0.03 to 5 parts, even more preferably 0.05 to 3 parts, by mass per 100 parts by mass of the flame retardant composition.

Examples of the plasticizer include epoxidized plasticizers, such as epoxidized soybean oil, epoxidized linseed oil, and epoxidized fatty acid octyl esters: methacrylate plasticizers; polyester plasticizers, such as dicarboxylic acid/polyhydric alcohol polycondensates and polycarboxylic acid/polyhydric alcohol polycondensates; polyether ester plasticizers, such as dicarboxylic acid/polyhydric alcohol/alkylene glycol polycondensates, dicarboxylic acid/polyhydric alcohol/arylene glycol polycondensates, polycarboxylic acid/polyhydric alcohol/alkylene glycol polycondensates, and polycarboxylic acid/polyhydric alcohol/arylene glycol polycondensates; aliphatic ester plasticizers, such as adipic esters and succinic esters, and aromatic ester plasticizers, such as phthalic esters, terephthalic esters, trimellitic esters, pyromellitic esters, and benzoic esters. These plasticizers may be may be used either individually or in combination thereof.

The plasticizer content in the flame retardant composition is selected from the range that does not impair the effects of the present invention and is preferably 0.1 to 500 parts, more preferably 1 to 100 part, even more preferably 3 to 80 parts, by mass per 100 parts by mass of the flame retardant composition.

Examples of the filler include talc, mica, calcium carbonate, calcium oxide, calcium hydroxide, magnesium carbonate, magnesium hydroxide, magnesium oxide, magnesium sulfate, aluminum hydroxide, barium sulfate, glass powder, glass fiber, clay, dolomite, silica, alumina, potassium titanate whisker, wollastonite, fibrous magnesium oxysulfate, and montmorillonite. The filler to be used is selected appropriately according to the particle size (or diameter, length, and aspect ratio of fibrous fillers). Where necessary, surface-treated fillers may be used. These fillers may be used either individually or in combination thereof.

The filler content in the flame retardant composition is selected from the range that does not impair the effects of the present invention and is preferably 0.01 to 500 parts, more preferably 1 to 100 parts, even more preferably 3 to 80 parts, by mass per 100 parts by mass of the flame retardant composition.

Examples of the fatty acid of the fatty acid metal salt include saturated fatty acids, such as capric acid, 2-ethylhexanoic acid, undecylic acid, lauric acid, tridecylic acid, myristic acid, pentadecylic acid, palmitic acid, margaric acid, stearic acid, nonadecylic acid, arachidic acid, heneicosylic acid, behenic acid, tricosylic acid, lignoceric acid, cerotic acid, montanoic acid, and melissic acid; straight chain unsaturated fatty acids, such as 4-decenoic acid, 4-dodecenoic acid, palmitoleic acid, α-linolenic acid, linoleic acid, γ-linolenic acid, stearidonic acid, petroselinic acid, oleic acid, elaidic acid, vaccenic acid, eicosapentaenoic acid, docosapentaenoic acid, and docosahexaenoic acid; and aromatic fatty acids, such as trimesic acid. Saturated fatty acids, such as myristic acid, stearic acid, and 12-hydroxystearic acid, are preferred.

Examples of the metal of the fatty acid metal salt include alkali metals, magnesium, calcium, strontium, barium, titanium, manganese, iron, zinc, silicon, zirconium, yttrium, barium, and hafnium. Alkali metals, such as sodium, lithium, and potassium, are preferred. The fatty acid metal salts may be used either individually or in combination.

The content of the fatty acid metal salt in the flame retardant composition is selected from the range that does not impair the effects of the present invention and is preferably 0.001 to 5 parts, more preferably 0.05 to 3 parts, by mass per 100 parts by mass of the flame retardant composition.

Examples of the antistatic include cationic antistatics, such as fatty acid quaternary ammonium ion salts and quaternary polyamine salts; anionic antistatics, such as higher alcohol phosphoric ester salts, higher alcohol EO adducts, polyethylene glycol fatty acid esters, anionic alkylsulfonates, higher alcohol sulfuric ester salts, higher alcohol ethylene oxide adduct sulfuric ester salts, and higher alcohol ethylene oxide adduct phosphoric ester salts; nonionic antistatics, such as polyhydric alcohol fatty acid esters, polyglycol phosphoric esters, and polyoxyethylene alkyl allyl ethers; and amphoteric antistatics, such as amphoteric alkyl betaines, e.g., alkyl dimethylaminoacetic acid betaine, and amphoteric imidazoline surfactants. These antistatics may be used either individually or in combination of two or more thereof.

The antistatic content in the flame retardant composition is selected from the range that does not impair the effects of the present invention and is preferably 0.01 to 20 parts, more preferably 3 to 10 parts, by mass per 100 parts by mass of the flame retardant composition.

The pigment may be chosen from commercially available products, including pigment red 1, 2, 3, 9, 10, 17, 22, 23, 31, 38, 41, 48, 49, 88, 90, 97, 112, 119, 122, 123, 144, 149, 166, 168, 169, 170, 171, 177, 179, 180, 184, 185, 192, 200, 202, 209, 215, 216, 217, 220, 223, 224, 226, 227, 228, 240, and 254; pigment orange 13, 31, 34, 36, 38, 43, 46, 48, 49, 51, 52, 55, 59, 60, 61, 62, 64, 65, and 71; pigment yellow 1, 3, 12, 13, 14, 16, 17, 20, 24, 55, 60, 73, 81, 83, 86, 93, 95, 97, 98, 100, 109, 110, 113, 114, 117, 120, 125, 126, 127, 129, 137, 138, 139, 147, 148, 150, 151, 152, 153, 154, 166, 168, 175, 180, and 185; pigment green 7, 10, and 36; pigment blue 15, 15:1, 15:2, 15:3, 15:4, 15:5, 15:6, 22, 24, 56, 60, 61, 62, and 64; and pigment violet 1, 19, 23, 27, 29, 30, 32, 37, 40, and 50. These pigments may be used either individually or in combination of two or more thereof.

The pigment content in the flame retardant composition of the present invention is selected from the range that does not impair the effects of the present invention and is preferably 0.0001 to 10 parts by mass per 100 parts by mass of the flame retardant composition.

The dye may be a commercially available product. Examples include azo dyes, anthraquinone dyes, indigoid dyes, triarylmethane dyes, xanthene dyes, alizarine dyes, acridine dyes, stilbene dyes, thiazole dyes, naphthol dyes, quinoline dyes, nitro dyes, indamine dyes, oxazine dyes, phthalocyanine dyes, and cyanine dyes. These dyes may be used either individually or as a mixture thereof.

The dye content in the flame retardant composition is selected from the range that does not impair the effects of the present invention and is preferably 0.0001 to 10 parts by mass per 100 parts by mass of the flame retardant composition.

[II] Flame-Retardant Resin Composition

The flame-retardant resin composition of the present invention contains at least one flame retardant composition of the present invention.

The flame-retardant resin composition of the present invention preferably contains the flame retardant composition in an amount of 10 to 400 parts, more preferably 10 to 300 parts, even more preferably 10 to 100 parts, still even more preferably 20 to 80 parts, by mass per 100 parts by mass of the resin. The flame retardancy of the resin is improved by the addition of at least 10 parts by mass of the flame retardant composition. The processability of the resin is not impaired as far as the content of the flame retardant composition is 400 parts or less by mass.

Examples of the resin for use in the flame-retardant resin composition include thermoplastic resins, such as polyolefin resins, polyester resins, vinyl resins, polycarbonate resins, acrylic resins, styrene resins, polyamide resins, polyphenylene oxide resins, and polyphenylene sulfide resins. These resins may be used either alone or in combination thereof. The resins may be alloyed resins.

The resin preferably has a melt flow rate (MFR) of 2.0 to 80 g/10 min, more preferably 8.0 to 60 g/10 min, as measured at 230° C. and a 2.16 kg load in accordance with JIS K7210, in view of processability and flame retardancy.

Examples of the polyolefin resins include polyethylene resins, such as polyethylene, low density polyethylene, linear low density polyethylene, and high density polyethylene; polypropylene resins, such as polypropylene, homopolypropylene, random copolymer polypropylene, block copolymer polypropylene, impact copolymer polypropylene, high impact copolymer polypropylene, isotactic polypropylene, syndiotactic polypropylene, hemisotactic polypropylene, maleic anhydride-modified polypropylene, and stereoblock polypropylene; α-olefin polymers, such as polybutene, cycloolefin polymers, poly-3-methyl-1-butene, poly-3-methyl-1-pentene, and poly-4-methyl-1-pentene; and α-olefin copolymers, such as ethylene-propylene block or random copolymers, ethylene-methyl methacrylate copolymers, and ethylene-vinyl acetate copolymers.

Examples of the polyester resins include saturated polyester resins obtained by using a dibasic acid, e.g., terephthalic acid, or an ester-forming derivative thereof as an acid component and a C2-C10 glycol or other dihydric alcohols or an ester-forming derivative thereof as a glycol component. Preferred of them are polyalkylene terephthalates in view of their well-balanced properties, such as processability, mechanical characteristics, electrical properties, and heat resistance. Examples of the polyalkylene terephthalates include polyethylene terephthalate, polybutylene terephthalate, and polyhexamethylene terephthalate.

Examples of the vinyl resins include homo- and copolymers of vinyl monomers, such as vinyl esters (e.g., vinyl acetate), chlorine-containing vinyl compounds (e.g., vinyl chloride), vinyl ketones, vinyl ethers, and vinylamines (e.g., N-vinylcarbazole); and copolymers of the vinyl monomers and other copolymerizable monomers. Derivatives of the vinyl resins, such as polyvinyl alcohol, polyvinyl acetals (e.g., polyvinyl alcohol, polyvinyl formal, and polyvinyl butyral), and ethylene-vinyl acetate copolymers, are also useful.

Examples of the polycarbonate resins include those obtained by the reaction between at least one bisphenol and phosgene or a carbonic acid diester and those obtained by interesterification between at least one bisphenol and a diphenyl carbonate. Examples of the bisphenol include hydroquinone, 4,4-dihydroxyphenyl, bis(4-hydroxyphenyl) alkanes, bis(4-hydroxyphenyl)cycloalkanes, bis(4-hydroxyphenyl) sulfide, bis(4-hydroxyphenyl) ether, bis(4-hydroxyphenyl) ketone, bis(4-hydroxyphenyl) sulfone, bisphenol fluorene, and their alkyl-, aryl-, or halogen-substituted derivatives. These polycarbonate resins may be used either individually or in combination of two or more thereof.

The polycarbonate resin may be used either alone or as blended with other resins to form a polymer alloy. Examples of such a polymer alloy include polycarbonate/ABS resin, polycarbonate/AS resin, polycarbonate/rubber polymer, polycarbonate/ABS resin/rubber polymer, polycarbonate/polyethylene terephthalate, polycarbonate/polybutylene terephthalate, polycarbonate/ASA resin, and polycarbonate/AES resin. The proportion of the polycarbonate resin in the polymer alloy is preferably 50 to 98 mass %.

Examples of the acrylic resins include polymers composed mainly of a (meth)acrylic ester, such as methyl (meth)acrylate, ethyl (meth)acrylate, butyl (meth)acrylate, or 2-ethylhexyl (meth)acrylate. The acrylic resin may be a homopolymer of such a (meth)acrylic ester or a copolymer composed of 50 mass % or more of the (meth)acrylic ester and less than 50 mass % of a copolymerizable monomer. Examples of the copolymerizable monomer include monofunctional ones, such as aromatic alkenyl compounds, e.g., styrene, α-methylstyrene, and vinyltoluene, alkenyl cyanides, e.g., acrylonitrile and methacrylonitrile, unsaturated carboxylic acids, e.g., acrylic acid and methacrylic acid, maleic anhydride, and N-substituted maleimide; and polyfunctional ones, such as polyhydric alcohol esters of polyunsaturated carboxylic acids, e.g., ethylene glycol dimethacrylate, butanediol dimethacrylate, and trimethylolpropane triacrylate, alkenyl esters of unsaturated carboxylic acids, e.g., allyl acrylate, allyl methacrylate, and allyl cinnamate, polyalkenyl esters of polybasic acids, e.g., diallyl phthalate, diallyl maleate, triallyl cyanurate, and triallyl isocyanurate, and aromatic polyalkenyl compounds, e.g., divinylbenzene.

Examples of the styrene resins include homo- and copolymers of styrene monomers (e.g., styrene and vinyltoluene); copolymers of a styrene monomer and a vinyl monomer, such as a (meth)acrylic monomer (e.g., (meth) acrylonitrile, (meth)acrylic esters, and (meth)acrylic acid), an α,β-monoolefinically unsaturated carboxylic acid or its anhydride or ester (e.g., maleic anhydride): styrene graft copolymers; and styrene block copolymers.

Examples of the polyamide resins include aliphatic polyamides, such as polyamide 46, polyamide 6, polyamide 66, polyamide 610, polyamide 612, polyamide 11, and polyamide 12; alicyclic polyamides obtained from alicyclic diamines (e.g., bis(aminocyclohexyl) C1-C3 alkanes) and aliphatic dicarboxylic acids (e.g., C8-C14 alkanedicarboxylic acids); polyamides obtained from aromatic dicarboxylic acids (e.g., terephthalic acid and/or isophthalic acid) and aliphatic diamines (e.g., hexamethylenediamine and nonamethylenediamine); and polyamides obtained from aromatic and aliphatic dicarboxylic acids (e.g., terephthalic acid and adipic acid) and aliphatic diamines (e.g., hexamethylenediamine).

Examples of the polyphenylene oxide resins include homopolymers, such as poly(mono-, di- or tri-(C1-C6-alkyl) phenylene)) oxides (e.g., poly(2,6-dimethyl-1,4-phenylene) oxide, poly(2,5-dimethyl-1,4-phenylene) oxide, and poly(2, 5-diethyl-1,4-phenylene) oxide), poly(mono- or di-(C6-C20 aryl)-phenylene)) oxides, and poly(mono(C1-C6 alkyl)- mono(C6-C20 aryl)-phenylene) oxides; random copolymers having a 2,6-dimethyl-1,4-phenylene oxide unit and a 2,3, 6-trimethyl-1,4-phenylene oxide unit; modified polyphenylene oxide copolymers composed of (i) an alkylphenol-modified benzene-formaldehyde resin block obtained by the reaction between a benzene-formaldehyde resin (e.g., phenol resin) or an alkylbenzene-formaldehyde resin and an alkylphenol (e.g., cresol) and (ii), as a main structure, a polyphenylene oxide block; and modified graft copolymers composed of polyphenylene oxide or a copolymer thereof having a styrene polymer and/or an unsaturated carboxylic acid or an anhydride thereof (e.g., (meth)acrylic acid or maleic anhydride) grafted thereto.

Examples of the polyphenylene sulfide resins include homopolymers and copolymers having a phenylene sulfide structure —(Ar—S)—, wherein Ar is a phenylene group. Examples of the phenylene group —Ar— include p-, m-, or o-phenylene group, a substituted phenylene group (e.g., an alkylphenylene group having a C1-C6 alkyl substituent or an arylphenylene group having, e.g., a phenyl group as a substituent), and —Ar-A$^1$-Ar—, wherein Ar is a phenylene group; and A$^1$ is a direct bond, O, CO, or SO$_2$.

The resin and the flame retardant composition of the present invention can be compounded by a known method without any limitations. For example, they may be compounded by mixing using a ordinary blender or mixer, melt-kneading using an extruder, or solution-casting using a solvent.

[III] Molded Article

The molded article of the present invention is obtained by molding the resin composition of the present invention. The methods and conditions for molding the resin composition are not particularly limited, and known molding methods and conditions may be adopted. Specific molding methods include extrusion molding, injection molding, inflation molding, and blow molding. These molding methods may be carried out under known molding conditions.

The shapes of the molded articles obtained by molding the resin composition of the present invention are not particularly limited and include sheets, films, and other specific shapes. The applications of the molded articles are not particularly limited and include food containers, electronic components, automotive parts, medical materials, film/sheet materials, fiber materials, optical materials, and resins for coatings, inks, toners, and adhesives. The molded articles of the present invention are especially suited for use as electronic components, such as wire, and automotive parts, such as automobile interior and exterior trim.

Example

The present invention will now be illustrated in greater detail with reference to Examples, but the present invention is not deemed to be limited thereto. Unless otherwise noted, all the parts and percentages are by mass.

Preparation of Flame-Retardant Resin Compositions:

A hundred parts of polypropylene resin (MFR: 8 g/10 min, JIS K7210, 230° C., 2.16 kg), 0.1 parts of calcium stearate as a higher fatty acid metal salt, 0.1 parts of tetrakis[3-(3,5-di-t-butyl-4-hydroxyphenyl)methyl propionate]methane as a phenolic antioxidant, 0.1 parts of tris(2, 4-di-t-butylphenyl) phosphite as a phosphorous antioxidant, and 0.4 parts of glycerol monostearate as a lubricant were premixed in a Henschel mixer to prepare a polypropylene resin composition. To the polypropylene resin composition was added the flame retardant composition shown in Tables 1 and 2 above and the comparative flame retardant composition shown in Table 3 below in an amount of 35.4 parts per 100 parts of the polypropylene resin to make a flame-retardant resin composition of Examples and Comparative Examples.

TABLE 3

| | | Comparative Flame Retardant Composition | | | | |
|---|---|---|---|---|---|---|
| | | A | B | C | D | E |
| Component (A) | piperazine polyphosphate | | | | | |
| | piperazine pyrophosphate | 60 | 60 | | | 100 |
| | piperazine orthophosphate | | | | | |
| Component (B) | melamine polyphosphate | | | | | |
| | melamine pyrophosphate | 40 | 40 | 100 | | |
| | melamine orthophosphate | | | | | |
| Ammonium Polyphosphate | | | | | 100 | |
| Component (C) | C-1*[1] | | | | 0.3 | |
| | C-2*[2] | | | 0.3 | | |
| | C-3*[3] | | | | | 0.3 |
| | C-4*[8] | 0.3 | | | | |
| | C-5*[9] | | 0.3 | | | |

*[8]Oil having a siloxane bond and a specific gravity of 0.925 (KF-96A-6cs from Shin-Etsu Silicone)
*[9]Oil having a siloxane bond and a specific gravity of 0.970 (KF-96-200cs from Shin-Etsu Silicone)

Preparation of Pellets:

The resulting flame-retardant resin compositions of Examples and Comparative Examples were each melt-kneaded in a twin-screw extruder (PCM30 from Ikegai Corp.) at a cylinder temperature of 200 to 250° C. and a screw speed of 150 rpm and extruded through a die into strands, which were cooled in a cooling bath and cut into pellets using a pelletizer.

Preparation of Specimens:

The pellets of each flame-retardant resin composition were injection molded using an injection molding machine NEX-80 from Nissei Plastic Industrial Co., Ltd., at a cylinder temperature of 220° C. and a mold temperature of 40° C. to make a test specimen measuring 100 mm×100 mm×3 mm (t).

Evaluation of Smoking Properties (Measurement of Smoke Density):

The test specimen was exposed to a heat flux of 35 kW/m$^2$ using a corn calorimeter in accordance with ISO 5660, and the maximum density of smoke generated from the specimen was measured in accordance with ASTM E662. The results are shown in Table 4 below.

Evaluation of Dusting Properties:

As illustrated in FIG. 1, a transparent acrylic resin cylinder 10 with one end open (outer diameter: 110 mm; inner diameter: 98 mm; length: 500 mm) was vertically placed with the open end up and surrounded by a black acrylic resin plate 11 on three sides. A 10 g sample of the flame retardant composition was dropped in free fall from the open end of the cylinder 10, and the dust generated in the cylinder was captured on video. A still image was taken from the video at the point 5 seconds after the sample reaching the bottom of the cylinder, and the brightness of the image at a part 12 about 150 mm from the lower end of the cylinder was extracted.

Image brightness values range from 0 (minimum) to 255 (maximum), and a smaller brightness value represents lesser dusting properties. The results are shown in Table 4. Note that a brightness value of 30 or greater indicates that the flame retardant composition being fed to a processing machine will generate a harmful effect on the working environment due to dusting.

TABLE 4

| | Flame Retardant Composition | Max. Smoke Density (l/m) | Dusting Properties |
|---|---|---|---|
| Example 1 | No. 7 | 0.49 | 25 |
| Example 2 | No. 12 | 0.48 | 28 |
| Example 3 | No. 13 | 0.49 | 26 |
| Example 4 | No. 15 | 0.45 | 24 |
| Example 5 | No. 17 | 0.37 | 25 |
| Example 6 | No. 18 | 0.39 | 24 |
| Example 7 | No. 22 | 0.33 | 22 |
| Example 8 | No. 24 | 0.35 | 19 |
| Example 9 | No. 25 | 0.32 | 17 |
| Comp. Example 1 | A | 0.58 | 30 |
| Comp. Example 2 | B | 0.60 | 31 |
| Comp. Example 3 | C | 1.50 | 28 |
| Comp. Example 4 | D | 0.91 | 40 |
| Comp. Example 5 | E | 0.90 | 45 |

Evaluation of Flame Retardancy:

The flame retardancy of the flame-retardant resin compositions of Examples and Comparative Examples was evaluated according to the procedures below. The results obtained are shown in Table 5 below.

Preparation of Specimens:

The pellets of each flame-retardant resin composition were injection molded using NEX-80 from Nissei Plastic Industrial Co., Ltd. at a screw temperature of 210° C. and a mold temperature of 40° C. to make a specimen for flammability test measuring 127 mm×12.7 mm×1.6 mm (t).

Evaluation of Flame Retardancy:

The specimen was tested by the 20 mm vertical burning test (UL-94V) in accordance with ISO 1210. Specifically, the specimen was held with the long axis vertical. A flame of a burner was applied to the lower end of the specimen for 10 seconds and removed, and the flame duration was recorded. As soon as the specimen stopped burning, the flame was reapplied for an additional 10 seconds, and the flame duration was measured in the same manner as in the first flame application. Ignition of the cotton layer placed below the specimen by any drips of flaming particles was also observed. The flame duration after each flame application and the ignition of the cotton layer were interpreted into a UL-94V flammability rating. The V-0 rating is the lowest flammability. The V-1 rating is less flame retardancy, and V-2 rating is still less flame retardancy.

TABLE 5

| | Flame Retardant Composition | Flammability Rating |
|---|---|---|
| Example 1 | No. 7 | V-0 |
| Example 2 | No. 12 | V-0 |
| Example 3 | No. 13 | V-0 |
| Example 4 | No. 15 | V-0 |
| Example 5 | No. 17 | V-0 |
| Example 6 | No. 18 | V-0 |
| Example 7 | No. 22 | V-0 |
| Example 8 | No. 24 | V-0 |
| Example 9 | No. 25 | V-0 |
| Comp. Example 1 | A | V-0 |
| Comp. Example 2 | B | V-0 |
| Comp. Example 3 | C | V-0 |
| Comp. Example 4 | D | V-0 |
| Comp. Example 5 | E | V-0 |

When comparing Examples 1 to 3 with Comparative Examples 1 and 2, although the resin compositions of Comparative Examples 1 and 2, which contain a flame retardant composition containing an oil having a siloxane bond and a specific gravity of less than 0.930 or not less than 0.970 at 25° C. as Component (C), exhibit good flame retardancy, they definitely have higher maximum smoke densities and higher dusting properties than those of Examples 1 to 3. When comparing Examples 3, 6, and 9 with Comparative Examples 3 to 5, it is apparent that the flame retardant compositions essentially containing the piperazine phosphate (A), melamine phosphate (B), and oil (C) having a siloxane bond and a specific gravity of 0.930 to less than 0.970 at 25° C. in a specific ratio allow for providing resin compositions exhibiting good flame retardancy, low smoking properties on combustion, and low dusting properties. Making a comparison between Examples 3, 6, and 9, it is clearly understood that a combined use of methylhydrogen oil (D) and hydrotalcite (E) brings about particularly excellent effects in preventing dusting and reducing maximum smoke density.

INDUSTRIAL APPLICABILITY

The flame retardant composition of the present invention is capable of providing a flame-retardant resin composition exhibiting good flame retardancy, low smoking properties, and low dusting properties.

The invention claimed is:

1. A flame retardant composition comprising (A) a piperazine phosphate, (B) a melamine phosphate, and (C) an oil having a siloxane bond and a specific gravity of 0.960 to less than 0.970 at 25° C., component (C) being present in an amount of 0.01 to 5 parts by mass per 100 parts by mass of the sum of components (A) and (B);
   wherein said composition further comprises (D) 0.01 to 5 parts by mass, per 100 parts by mass of the sum of components (A) and (B), of a methylhydrogen silicone oil having hydrogen in a part of the side chains of polysiloxane and a specific gravity of 0.970 to less than 1.01 at 25° C.

2. The flame retardant composition according to claim 1, wherein component (A) mainly comprises piperazine pyrophosphate, component (B) mainly comprises melamine pyrophosphate, and the mass ratio of components (A) to (B) is 90:10 to 50:50.

3. The flame retardant composition according to claim 1, further comprising (E) 0.01 to 5 parts by mass, per 100 parts by mass of the sum of components (A) and (B), of hydrotalcite.

4. A flame-retardant resin composition comprising 100 parts by mass of a resin and 10 to 400 parts by mass of the flame retardant composition according to claim 1.

5. A molded article obtained from the flame-retardant resin composition according to claim 4.

6. The flame retardant composition according to claim 2, further comprising (E) 0.01 to 5 parts by mass, per 100 parts by mass of the sum of components (A) and (B), of hydrotalcite.

7. A flame-retardant resin composition comprising 100 parts by mass of a resin and 10 to 400 parts by mass of the flame retardant composition according to claim 2.

8. A flame-retardant resin composition comprising 100 parts by mass of a resin and 10 to 400 parts by mass of the flame retardant composition according to claim 3.

9. A flame-retardant resin composition comprising 100 parts by mass of a resin and 10 to 400 parts by mass of the flame retardant composition according to claim 6.

10. A molded article obtained from the flame-retardant resin composition according to claim 7.

11. A molded article obtained from the flame-retardant resin composition according to claim 8.

\* \* \* \* \*